United States Patent
Jafarkhani et al.

(10) Patent No.: US 10,116,372 B2
(45) Date of Patent: Oct. 30, 2018

(54) INTERLEAVED TRAINING AND LIMITED FEEDBACK FOR MULTIPLE-ANTENNA SYSTEMS

(71) Applicant: The Regents of the University of California, Oakland, CA (US)

(72) Inventors: Hamid Jafarkhani, Irvine, CA (US); Erdem Koyuncu, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/604,102

(22) Filed: May 24, 2017

(65) Prior Publication Data

US 2017/0346541 A1    Nov. 30, 2017

Related U.S. Application Data

(60) Provisional application No. 62/341,014, filed on May 24, 2016.

(51) Int. Cl.
*H04B 7/02* (2018.01)
*H04B 7/06* (2006.01)
*H04B 7/0417* (2017.01)

(52) U.S. Cl.
CPC ......... *H04B 7/0626* (2013.01); *H04B 7/0417* (2013.01); *H04B 7/0684* (2013.01)

(58) Field of Classification Search
CPC .... H04B 7/0626; H04B 7/0452; H04B 17/12; H04B 7/0456; H04B 7/0417; H04B 7/0617; H04B 7/0632; H04B 7/10; H04B 7/0634; H04B 17/309; H04L 25/03343; H04W 16/28
USPC .................................................. 375/267, 295
See application file for complete search history.

(56) References Cited

U.S. PATENT DOCUMENTS

| | | | | |
|---|---|---|---|---|
| 2007/0093274 A1* | 4/2007 | Jafarkhani | ........... | H04B 7/0617 455/562.1 |
| 2012/0214538 A1* | 8/2012 | Kim | ...................... | H04W 52/50 455/522 |
| 2016/0157218 A1* | 6/2016 | Nam | .................... | H04B 7/0456 370/329 |

* cited by examiner

*Primary Examiner* — Leila Malek
(74) *Attorney, Agent, or Firm* — Marcus C. Dawes; Daniel L. Dawes

(57) ABSTRACT

A method includes the step of interleaving training and feedback stages in a transmitter and a multiplicity of antennas, wherein the transmitter trains the corresponding ones of the multiplicity of antennas one by one and receives feedback information after training each one of the corresponding ones of the multiplicity of antennas. An apparatus operating using the method includes a multiple-input single-output system with t transmitter antennas, a short-term power constraint P, and target data rate $\rho$ where for any t, the same outage probability as a system with perfect transmitter and receiver channel state information is achieved with a feedback rate of $R_1$ bits per channel state and via training $R_2$ transmitter antennas on average, where $R_1$ and $R_2$ are independent of t, and depend only on $\rho$ and P.

12 Claims, 2 Drawing Sheets

INTERLEAVED TRAINING AND LIMITED FEEDBACK FOR MULTIPLE-ANTENNA SYSTEMS

RELATED APPLICATIONS

The present application is a non-provisional application of U.S. application Ser. No. 62/341,014, filed on May 24, 2016, which is incorporated herein by reference and to which priority is claimed pursuant to 35 USC 119.

BACKGROUND

Field of the Technology

The invention relates to the field of wireless communication and in particular with beamforming, feedback and channel training.

Description of the Prior Art

The performance of a wireless communication system can be greatly improved by making the channel state information (CSI) available at the transmitter and the receiver. In wireless communications, channel state information (CSI) refers to known channel properties of a communication link. This information describes how a signal propagates from the transmitter to the receiver and represents the combined effect of, for example, scattering, fading, and power decay with distance. The CSI makes it possible to adapt transmissions to current channel conditions, which is crucial for achieving reliable communication with high data rates in multi-antenna systems. In a massive multiple-input single-output (MISO) system, having CSI at the transmitter (CSIT) is especially desirable as one can then fully exploit the performance gains promised by the large number of transmitter antennas via CSI-adaptive transmission strategies such as beamforming. A typical way to acquire CSIT is channel training followed by (digital) feedback.

Training and feedback are traditionally viewed as two non-interleaving processes, as shown in prior art FIG. 1. According to this traditional viewpoint, for each channel state, the transmitter first trains all of its antennas at once, so that the receiver acquires the entire CSI (or, in general, an erroneous version thereof.). This initial training phase is followed by the receiver feeding back a possibly-quantized version of the CSI. The receiver's feedback is then utilized at the transmitter side for data transmission (e.g., as a quantized beamforming vector.). Designing such limited feedback systems is a fundamental problem of communication theory and has been the subject of many publications and at least one survey.

The conventional scheme in prior art shown FIG. 1 appears to be infeasible in the case of a massive MISO system. Even the training phase, by itself, would be very challenging to realize due to the large number of transmitter antennas that need to be trained. Moreover, even if one assumes that the training stage somehow comes with no cost, feeding back the associated large number of channel values to the transmitter appears to be infeasible. Conventional limited feedback schemes also do not provide much hope in this context: The feedback rates required for even the simplest of the limited feedback schemes, such as antenna selection, theoretically grow without bound as the number of transmitter antennas grow to infinity.

BRIEF SUMMARY

Our proposed solution is to interleave the training and feedback stages. Unlike the conventional scheme of the prior art, the transmitter trains its antennas one by one and receives feedback information after training each one of its antennas. A feedback message may ask the transmitter to train another antenna (and also provide side information about the channel state), or it may result in the termination of the training phase, in which case it also provides the quantized code word to be utilized by the transmitter for data transmission.

An interleaved scheme offers the following unique opportunity: If the already-trained antennas provide sufficiently favorable conditions for data transmission, one can then terminate the training phase and thus avoid wasting more resources on training the rest of the antennas. In certain scenarios, we can make use of this opportunity to design multi-antenna communication systems whose feedback and training overheads remain completely independent of the number of transmitter antennas, and which, at the same time, can achieve the same performance as a system with perfect transmitter and receiver CSI. Specifically, in the illustrated embodiment we consider a single-user point-to-point MISO system having an outage probability performance measure. Extensions to multiple-input multiple-output (MIMO) systems, or to multiuser scenarios with different performance measures are also within the scope and spirit of the invention.

We introduce and investigate the opportunities of multi-antenna communication schemes whose training and feedback stages are interleaved and mutually interacting. Specifically, unlike the traditional schemes where the transmitter first trains all of its antennas at once and then receives a single feedback message, we consider a scenario where the transmitter instead trains its antennas one by one and receives feedback information immediately after training each one of its antennas. The feedback message may ask the transmitter to train another antenna; or it may terminate the feedback/training phase and provide a quantized code word (e.g., a beamforming vector) to be utilized for data transmission.

As a specific application, we consider a multiple-input single-output system with t transmitter antennas, a short-term power constraint P, and a target data rate $\rho$. We show that for any t, the same outage probability as a system with perfect transmitter and receiver channel state information can be achieved with a feedback rate of R1 bits per channel state and via training R2 transmitter antennas on average, where R1 and R2 are independent of t, and depend only on $\rho$ and P.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
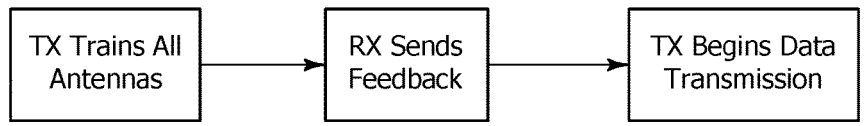
FIG. 1 is a block diagram showing a conventional training and limited feedback. TX and RX stand for the transmitter and the receiver, respectively.
Figure 2:
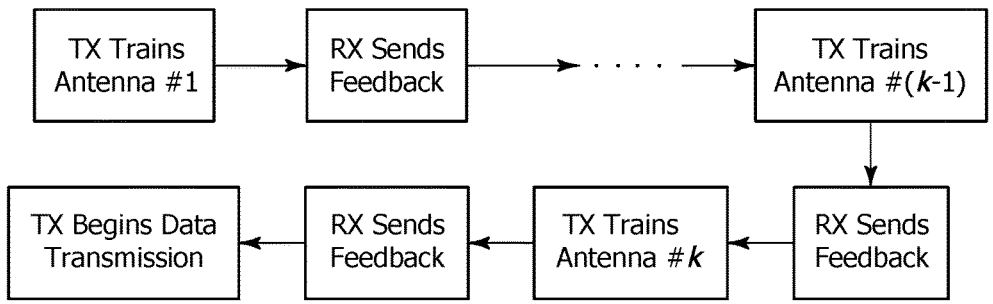
FIG. 2 is a block diagram of the illustrated embodiments showing an interleaved training and limited feedback. The number of trained antennas k varies from one channel state to another, and is itself decided through the training and feedback phases.

Our proposed solution is to interleave the training and feedback stages as shown in FIG. 2. Unlike the conventional scheme in FIG. 1, the transmitter trains its antennas one by one and receives feedback information after training each one of its antennas. A feedback message may ask the transmitter to train another antenna (and also provide side information about the channel state), or it may result in the termination of the training phase, in which case it also provides the quantized code word to be utilized by the transmitter for data transmission.

An interleaved scheme offers the following unique opportunity: If the already-trained antennas provide sufficiently favorable conditions for data transmission, one can then terminate the training phase and thus avoid wasting more resources on training the remaining antennas. As a result in certain scenarios, we can make use of this opportunity to design multi-antenna communication systems whose feedback and training overheads remain completely independent of the number of transmitter antennas, and which, at the same time, can achieve the same performance as a system with perfect transmitter and receiver CSI. Specifically, we consider here a single-user point-to-point MISO system having an outage probability performance measure. Extensions to multiple-input multiple-output (MIMO) systems, or to multiuser scenarios with different performance measures are within the scope and spirit of the invention.

Preliminaries

We consider a MISO system with t transmitter antennas. The channel from transmitter antenna i to the receiver antenna is denoted by $h_i$, and let $h=[h_1 \ldots h_t]^T \in C^t$ represent the entire channel state. We assume that $h \sim CN(I_t)$, where $I_t$ is intensity of the transmitted signal and CN(.) is the circularly-symmetric complex normal distribution. The transmitted symbol $s \in C^t$ and the received symbol $y \in C$ have the input-output relationship $y = s^T \sqrt{P}h + \eta$, where P is the short-term power constraint of the transmitter, and the noise term $\eta \sim CN(1)$ is independent of h.

For a fixed h, suppose that input symbol s is distributed as $CN(K^T)$, where K is a covariance matrix with $tr(K) \leq 1$. With perfect channel state information at the receiver, CSIR, the channel capacity under this strategy is $\log_2(1+h^\dagger KhP)$ bits/sec/Hz. For a given target data transmission rate $\rho = \log_2(1+\alpha P)$, where $\alpha > 0$ can be chosen arbitrarily, an outage event occurs if $\log_2(1+h^\dagger KhP) < \rho$, or equivalently if $h^\dagger Kh < \alpha$. We refer to one special case where $K = xx^\dagger$ for some $X \in C^t$ with $\|x\| \leq 1$ as "beamforming," in which case the outage event is $\langle x, h \rangle^2 < \alpha$.

For random h, the transmitter can utilize different covariance matrices for different h. For this purpose, let $M: C^t \rightarrow C^{t \times t}$ be an arbitrary mapping, so that given h, the input symbol is distributed as $CN([M(h)]^T)$. We define the outage probability with M as $out(M) \triangleq P(h^\dagger Mh < \alpha)$. We often consider beamforming-only systems, so that for a mapping $N: C^t \rightarrow C^t$, we define $out(N) \triangleq P|\langle N(h), h \rangle|^2 < \alpha)$.

With perfect channel state information at the transmitter, CSIT, and CSIR (a "full-CSI" system), the optimal mapping that minimizes the outage probability is beamforming along h. In other words, the mapping $F(h) \triangleq h/\|h\|$ provides the minimum-possible outage probability $out(F) = P(\|h\|^2 \leq \alpha)$. With perfect CSIR but no CSIT (an "open-loop" system), it has been shown that the optimal mapping is $$G(h) \triangleq \frac{1}{\kappa} \begin{pmatrix} I_\kappa & 0_{\kappa \times (t-\kappa)} \\ 0_{(t-\kappa) \times \kappa} & 0_{\kappa \times \kappa} \end{pmatrix}$$

where $\kappa = \arg\min_k P(\Sigma_{i=1}^k |h_i|^2 < \kappa\alpha)$. Hence, only $\kappa$ out of the t antennas are used in general, and we have $out(G) = P(\|h_\kappa\|^2 < \kappa\alpha)$.

The outage performance of two communication systems are usually compared in terms of their $\alpha$-asymptotic behaviors for a fixed t. For example, given a fixed t, as $\alpha \rightarrow 0$, we have $out(F) \in \theta(\alpha^t)$ and $out(G) \in e(\alpha^t)$ so that the outage probabilities of a full-CSI and an open-loop system have the same $a \rightarrow 0$ behavior (they both provide a "diversity gain" of t.). In contrast, we are primarily interested in the t-asymptotic behavior of outage probabilities for a fixed a. The following proposition, provides a rough characterization in this context.

Proposition 1 As $t \rightarrow \infty$, for a full-CSI system, we have $$out(F) \in \Theta\left(\frac{\alpha^t}{t!}\right),$$

whereas for an open-loop system, $$out(G) \in \begin{cases} \Theta\left(\frac{(t\alpha)^t e^{\alpha t}}{t!}\right), & 0 < \alpha < 1 \\ \Theta(1), & \alpha \geq 1 \end{cases} \quad (1)$$

Moreover, if $0 < \alpha < 1$, then $\kappa = t$ for every sufficiently large t, but if $\alpha \geq 1$, then $\kappa \in \Theta(1)$ as $t \rightarrow \infty$.

This result brings both good and bad news. The good news is that for a full-CSI system, one can transmit with an arbitrarily large data rate (by choosing a sufficiently large $\alpha$) with a fixed power consumption P and zero outage as $t \rightarrow \infty$. The bad news is that it is not always possible to do the same in an open-loop system: When $\alpha > 1$, the outage probability does not decay with increasing t, and in fact, it saturates to a certain non-zero value. Also, for $0 < \alpha < 1$, even though we have $out(G) \rightarrow 0$ as $t \rightarrow \infty$, there is still room for improvement: As t increases, the outage probability of a full-CSI system decays much faster than that of an open-loop system.

In order to obtain a vanishing outage probability as $t \rightarrow \infty$ for every a, one should thus utilize CSIT. The full-CSI system is impractical as it requires an "infinite" rate of feedback from the receiver to the transmitter. A more practical approach is to settle for quantized CSIT via finite-rate receiver feedback. Another issue that is common to both a full-CSI and an open-loop system is the requirement of perfect CSIR, which may, by itself, not be feasible when t is large. In the following, we thus consider the design of partial CSIT, partial CSIR schemes that are based on the idea of interleaving the training and feedback processes as shown in FIG. 2.

Interleaved Training and Limited Feedback

We begin with a simple example of an interleaved scheme that is based on antenna selection. We first describe its conventional non-interleaved counterpart.

A. The Conventional Antenna Selection Scheme

A well-known partial-CSIT scheme is what we shall refer to as the "conventional" antenna selection scheme: Given h, the transmitter first trains all of its antennas to the receiver so that the receiver acquires the entire CSI. The receiver determines the antenna index $\tau \triangleq \arg\max_i |h_i|$ with the highest channel gain and sends $\lceil \log_2 t \rceil$ feedback bits to the transmitter that can uniquely represent $\tau$. The transmitter recovers $\tau$ from the feedback bits and transmits over antenna $\tau$.

This scheme can be characterized by the mapping $A(h) \triangleq \Theta_\tau$, where $e_i = [0_{1 \times (i-1)} \ 1 \ 0_{1 \times (t-i)}]^T$, $i=1, \ldots, t$ are the standard basis vectors for $\mathbb{C}^t$. We have $\text{out}(A) = (1-e^{-\alpha})^t$, which implies $\forall \alpha > 0$, $\lim_{t \to \infty} \text{out}(A) = 0$. Hence, for every $\alpha > 0$, we can obtain a vanishing outage probability as $t \to \infty$, as desired. Moreover, for any $\alpha$ and t, we have $\text{out}(A) \leq \text{out}(G)$, and in fact, it can be shown (e.g. by applying Stirling's approximation to (1)) that $\text{out}(A) \in o(\text{out}(G))$, $\forall \alpha \in (0, 1)$. Hence, relative to an open-loop system, antenna selection improves the t-asymptotic behavior of the outage probability for all $\alpha > 0$. On the other hand, to implement this scheme, one needs to train t scalar channels (one for each $h_i$) and feed back $|\log_2 t|$ bits for every channel state. Clearly, this is not feasible in the $t \to \infty$ regime.

B. A New Antenna Selection Scheme

The conventional antenna selection scheme is excessively precise in the sense that it always tries to select the antenna with the highest gain. On the other hand, without any loss of optimality in terms of the outage probability, we can in fact select any one of the antennas that avoid outage (not necessarily the antenna that provides the highest channel gain) whenever there is one. We use this observation to design an alternate antenna selection scheme that is based on the idea of interleaving training and limited feedback.

Figure 3:
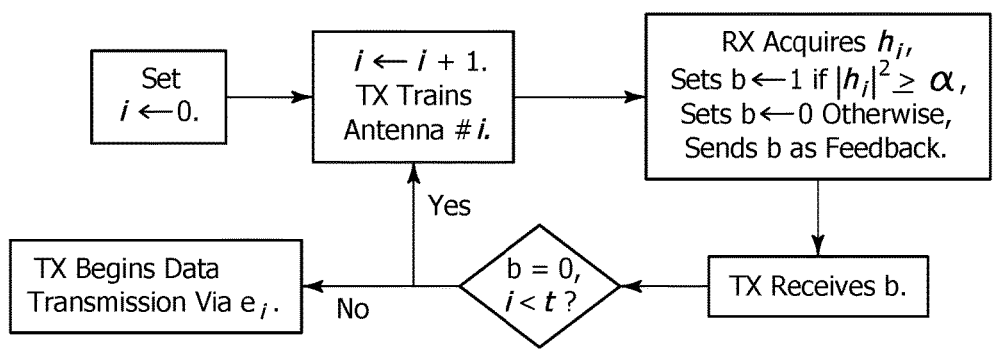
FIG. 3 is a block diagram of the new antenna selection scheme of the illustrated embodiments.

Our new antenna selection scheme operates as shown in FIG. 3. The transmitter first trains the channel $h_1$ corresponding to the first antenna and waits for receiver feedback. The receiver, having acquired the knowledge of $h_1$, sends the one-bit feedback message "1" if $|h_1|^2 \geq \alpha$, i.e. if selecting the first antenna avoids outage. Otherwise, it feeds back a "0," which indicates that selecting the first antenna will result in an outage. Now, if the transmitter receives a "1," the training and feedback process can end; the transmitter starts data transmission over the first antenna only (without the need of training the remaining antennas) and outage is avoided. Otherwise, if the transmitter receives a "0," it proceeds to training the channel state $h_2$ corresponding to its second antenna. The process continues in the same manner until an antenna (selection vector) that avoids outage is found. If all the antennas result in an outage, then the transmitter can simply transmit over an arbitrary antenna.

Clearly, the new scheme achieves the same outage probability $(1-e^{-\alpha})^t$ as the conventional scheme discussed above. Let us now define and calculate its training and feedback overheads. Note that the transmitter trains a different number of antennas for different channel states. Therefore, we define the "training rate" of the scheme (measured in antennas per channel state) as the expected number of antennas that the transmitter needs to train, where the expectation is over all the channel states. Also, the receiver feeds back a different number of feedback bits for different channel states, so that we may define the "feedback rate" of the scheme (measured in bits per channel state) as the number of receiver feedback bits averaged over all the channel states. Now, given $1 \leq i \leq t-1$, the transmitter trains only the first i antennas with probability $e^{-\alpha}(1-e^{-\alpha})^{i-1}$, and it trains all the t antennas with probability $e^{-\alpha}(1-e^{-\alpha})t - 1 + (1-e^{-\alpha})^t$. The training rate is thus:

$$\Sigma_{i=1}^t i e^{-\alpha}(1-e^{-\alpha})^{i-1} + t(1-e^{-\alpha})^t = e^{\alpha}(1-(1-e^{-\alpha})^t).$$

[43] A similar calculation reveals that the feedback rate of the new scheme is actually (numerically) equal to its training rate. Hence, the training and the feedback rates of the new scheme are both given by the formula $e^{\alpha}(1-(1-e^{-\alpha})^t)$. Note that for any t, the two rates are both upper bounded by $e^{\alpha}$, which is independent of t.

The significance of the new scheme is that it provides a vanishing outage probability as $t \to \infty$ with t-independent training and feedback rates. One can thus obtain the benefits of having infinitely many antennas with finite training and feedback overheads. For example, setting $\alpha = 1$, we can observe that if the transmitter has infinitely many antennas, then for any given power constraint P, we can transmit with rate $\log(1+P)$ bits/sec/Hz outage-free via training only $e < 3$ antennas and feeding back 3 bits on average.

Also, comparison with an open-loop system (a system with perfect CSIR but no CSIT) leads to the following conclusion: It is much better to have a little bit of CSIT and a little bit of CSIR rather than to have perfect CSIR but no CSIT.

C. General Description of an Interleaved Scheme

So far, we have discussed many seemingly-different scenarios including non-interleaved or interleaved schemes, the full-CSI and the open-loop systems, and so on. All of these scenarios can in fact be viewed as manifestations of a single unifying framework of a scheme, which describes the rules of how the tasks of training and feedback are to be performed. The advantage of this viewpoint is that it will allow us to more meaningfully compare the different scenarios with respect to their outage probabilities and training/feedback rates.

One task of a scheme S is to specify a quantized covariance matrix S(h). The outage probability with S is thus given by out(S). A scheme S also describes which antennas are to be trained in which order, the corresponding feedback messages of the receiver, and how these messages are decoded at the transmitter. An example of these "inner workings" of a scheme can be found above for the special case of our new antenna selection scheme. The two important figures of merit of S is its training rate tr(S) and its feedback rate fr(S), which can be defined in the same manner as we have done above.

Using these definitions, we can now view a full-CSI system as one particular scheme F with $\text{out}(F) = P(\|h\|^2 < \alpha)$, $\text{tr}(F) = t$, and $\text{fr}(F) = \infty$, an open-loop system as another scheme G with $\text{out}(G) = P\{\|h\|^2 < \kappa\alpha\}$, $\text{tr}(G) = \kappa$, and $\text{fr}(G) = 0$, and the conventional antenna selection as a scheme A with $\text{out}(A) = (1-e^{-\alpha})^t$, $\text{tr}(A) = t$, and $\text{fr}(A) = \lceil \log_2 t \rceil$. These extend the previous definitions in a consistent manner. Also, regarding the new antenna selection scheme described above, we have proved the following theorem: Theorem 1 There is a scheme B with $\text{out}(B) = \text{out}(A) = (1-e^{-\alpha})^t$ and $\text{tr}(B) = \text{fr}(B) = e^{\alpha}(1-(1-e^{-\alpha})^t) < e^{\alpha}$.

Theorem 1 shows the existence of a "good" scheme that can achieve a vanishing outage probability as $t\to\infty$ with t-independent feedback and training rates. One fundamental question that immediately comes to mind is then to determine whether one can achieve the ultimate limit out(F) with again t-independent training and feedback rates. The answer is yes, and the construction of such a scheme will be provided next. Meanwhile, we note that even though antenna selection provides a reasonable performance, we still have out(F)$\in$o(out(A)) as $t\to\infty$. In other words, the outage probability with a full-CSI system decays much faster than the one with antenna selection. This also provides a "practical motivation" for construction of schemes that achieve the full-CSI gains.

Achieving the Full-CSI Gains by Interleaving

A. Variable-Length Limited Feedback with Perfect CSTR

We begin by defining a simple dead zone scalar quantizer. For any given integer $l\geq 0$ and $x\in(-1, +1]$, let $$q(x; l) \stackrel{\Delta}{=} \text{sign}(x)\frac{1}{2^{l+1}}\lfloor |x|2^{l+1}\rfloor$$

We can easily calculate $q(x; l)$ by taking the most significant $l+2$ bits $(b_1, b_2 \ldots b_{l+1})_2$ of the binary representation $(b_1, b_2 \ldots )_2$ of $|x$, while preserving the sign of x. For example, we have $q(\pm(0.101)_2; 1)=\pm(0.10)_2$.

We extend the definition of the dead zone quantizer q to an arbitrary beamforming vector $X=[s_1 \ldots x_t]^T \in \mathbb{C}^t$ with $\|x\|\leq 1$ by setting $q(x; l)=[q(\mathcal{R} x_1; l)+jq(\mathfrak{I} x_1; l) \ldots q(\mathcal{R} x_t; l)+jq(\mathfrak{I} x_t; l)]^T \in \mathbb{C}^t$. We refer to the parameter t as the "resolution" of q. Note that by construction, $\|q(x; l)\|\leq 1$, and therefore, $q(x; l)$ is itself a feasible beamforming vector. Moreover, for a fixed l and t, each quantized vector $q(x; l)$ can be uniquely represented by $2t(l+3)$ bits (For each of the 2t complex dimensions of x, we spend one bit for the sign, and $l+2$ bits for the most significant $l+2$ binary digits.).

Now, for an arbitrary channel state h with $\|h\|^2>\alpha$, let $$L(h) \stackrel{\Delta}{=} \max\left\{\lceil \log_2(4t)\rceil, \left\lceil \log_2 \frac{4t\alpha}{\|h\|^2-\alpha}\right\rceil\right\} \text{ and}$$

$$\vec{h} \stackrel{\Delta}{=} F(h) = \frac{h}{\|h\|}.$$

We have the following proposition.

Proposition 2 Let $h\in\mathbb{C}^t$ with $\|h\|^2>\alpha$ for some $t\geq 1$. Then, $$|\langle q(\vec{h};L(h)),h\rangle|^2>\alpha.$$

This result has the following interpretation. Suppose $\|h\|^2>\alpha$ and thus outage is avoidable with the beamforming vector $\vec{h}$. By construction, the sequence of quantized beamforming vectors $q(\vec{h}; l)$, $l\geq 0$ (which are feasible since $\|q(\vec{h}; l)\|\leq\|\vec{h}\|=1$) provide an increasingly finer approximation of $\vec{h}$ as the resolution l grows to infinity. The proposition shows that for every given h with $\|h\|^2>\alpha$, there is in fact a "sufficient resolution" $L(h)$ (that depends only on $\|h\|$) such that the quantized beamforming vector $q(\vec{h};l)$ can avoid outage.

Proposition 2 leads to the following limited feedback scheme under the assumption of perfect CSIR: If $\|h\|^2>\alpha$, the receiver calculates the required resolution $L(h)$ to avoid outage, and sends $2t(L(h)+3)$ feedback bits that represent the corresponding outage-avoiding beamforming vector $q(\vec{h};$ $L(h))$. The transmitter, which we assume can perfectly know the length of the feedback code word that it has received, first recovers $L(h)$, and then the beamforming vector $q(\vec{h};$ $L(h))$. Otherwise, if $\|h\|^2\leq\alpha$, outage is unavoidable except for channel states $\|h\|^2=\alpha$ with zero probability. Ln this case, the receiver sends the one-bit feedback message "0" so that the transmitter can transmit with an arbitrary but fixed beamforming vector, say $e_1$. We refer to this scheme as scheme $C_t$, where the subscript indicates the number of transmitter antennas. We have $C_t(h)=q(\vec{h}; L(h))$. By construction, $C_t$ achieves the full-CSI outage probability with the feedback rate $$fr(C_t)=P(\|h\|^2\leq\alpha)+\Sigma_{l=\lceil log_2(4t)\rceil}2t(l+3)p_l, \quad (2)$$

where $p_l \stackrel{\Delta}{=} P(L(h)=l, \|h\|^2>\alpha)$. As $l\to\infty$, $p_l$ can be shown to decay fast enough so that the resulting feedback rate is finite. Intuitively, instead of trying to pick the best beamforming vector that maximizes the signal-to-noise ratio in some given codebook, one spends just enough bits to describe a beamforming vector that avoids outage. This allows us to achieve the full-CSI performance with a finite feedback rate under the assumption of perfect CSIR.

B. Achieving out{F} by Interleaving

We now return to our main goal of designing a scheme that can achieve the full-CSI outage probability with finite training and feedback rates. The scheme $C_t$ as described above is not immediately applicable for our purposes as (i) it requires perfect CSIR and thus induces a training rate of t, and (ii) according to equation 2, its feedback rate grows at least as $\theta(t)$ (We have $$fr(C_t)\geq 6t\Sigma_{l=\lceil log_2(4t)\rceil}pl=6tP(\|h\|^2>\alpha)\in\theta)t).).$$

Figure 4:
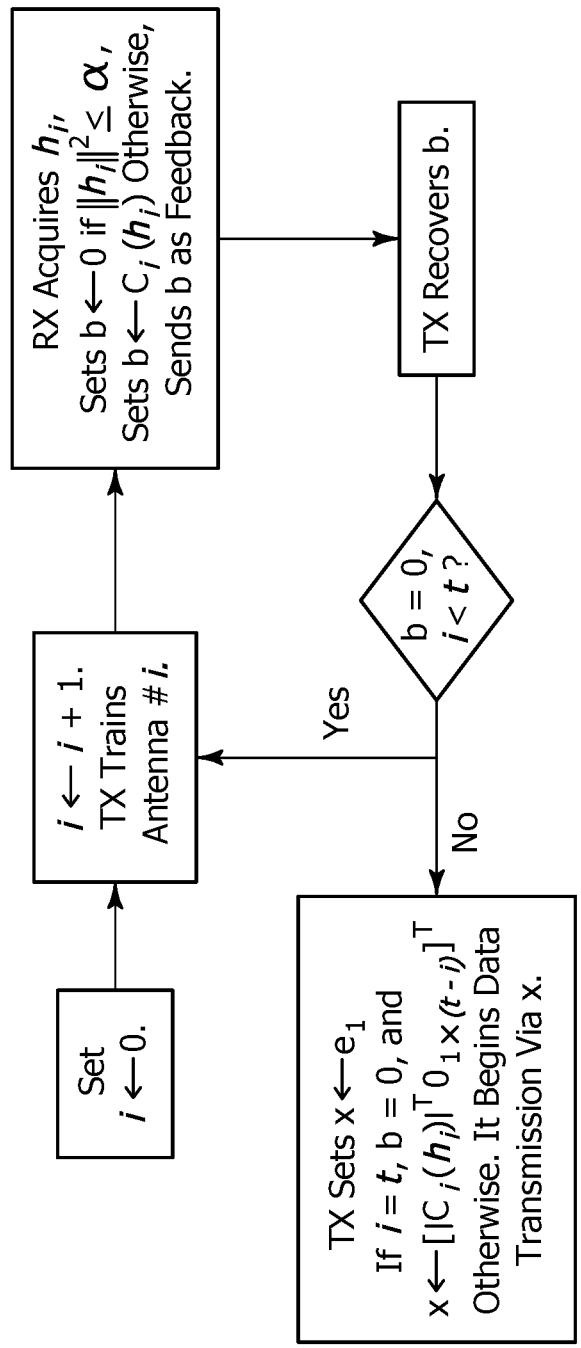
FIG. 4 is a block diagram of an operation of scheme D of the illustrated embodiments.

We can however incorporate the sequence of schemes $C_i$, $i=1, \ldots, t$ as sub-blocks of an interleaved training and limited feedback scheme D as shown in FIG. 4. In the figure, we use the notation $h_i \stackrel{\Delta}{=} [h_1 \ldots hi]^T$, $i=1, \ldots t$ to represent the first i components of the channel state h. Given h and a value of the variable $i\in\{1, \ldots, t\}$ in the figure, suppose that the transmitter has "just" trained its ith antenna, so that the receiver has acquired the knowledge of $h_i$. At this stage, the receiver knows the channel values $h_1, \ldots, h_i$ corresponding to the first i antennas of the transmitter, or equivalently, it knows $h_i$. We consider the following two cases for the receiver's feedback and the corresponding transmitter action.

If $\|h_i\|^2\leq\alpha$, as far as the channels that have been made available to the receiver are concerned, outage is unavoidable with probability 1. The receiver thus requests the transmitter to train the next antenna by sending the feedback bit "0," and the transmitter complies. The case i=t is an exception: Outage is unavoidable with any beamforming vector with probability 1 (we have $\|h_t\|^2=\|h\|^2\leq\alpha$), and thus the transmitter transmits via the (arbitrarily chosen) beamforming vector $e_1$.

On the other hand, if $\|h_i\|^2>\alpha$, the receiver feeds back the i-dimensional vector $C_i(h_i)=q(\vec{h}_i; L(h_i))$ using $2i(L(h_i)+3)$ feedback bits. By Proposition 2, we have $|\langle C_i(h_i),h_i\rangle|^2>\alpha$. This implies that the actual t-dimensional beamforming vector utilized at the transmitter, which is simply constructed by appending t−i zeroes to $C_i(h_i)$, will also avoid outage.

By construction, scheme D avoids outage for any channel state h with $\|h\|^2>\alpha$. Hence, it achieves the full-CSI outage probability out(F). Calculations for the training and feedback rates of D are slightly more involved.

Theorem 2 We have out(D)=out(F) with tr{D}≤1+α and fr(D)≤86(1+α³).

We shall emphasize that Theorem 2 should be interpreted as "just" an achievability result. Its main message is that the full-CSI performance can be achieved with t-independent training and feedback rates. Hence, the α-dependent bounds in the statement of Theorem 2 are not necessarily the best-possible as far as a general scheme that can achieve out(F) is concerned (this can be observed from the proof of the theorem itself.).

Let us now first compare the results of Theorem 2 with what we have achieved by Theorem 1 using the antenna selection scheme B. For scheme B, we have tr(B), fr(B)∈Θ(e^α) as a→∞, while for scheme D, we have tr(D)∈Θ(α) and fr(D)∈O(α log α). Hence, there are certain values of t and α where the scheme D improves upon scheme B in every aspect. It should be clear why scheme D provides a better outage performance. Regarding the training rates, note that scheme B terminates only if the most-recently trained antenna avoids outage. On the other hand, scheme D terminates whenever the joint contribution of all trained antennas avoids outage. Therefore, for every channel state, scheme D always terminates before scheme B does, and thus, in fact, tr(D)≤tr(B). The efficiency of scheme D in terms of training also positively affects its feedback rate: The fewer the amount of antennas that one needs to train, the fewer the feedback messages spent requesting these antennas to be trained.

An interesting special case of Theorem 2 is to assume P is large (but still fixed), and choose α=P^{m-1} for some m>1. Then, if the transmitter has infinitely many antennas (for a simpler discussion, we put the physical impossibility of such an assumption aside), Theorem 2 tells us that we can transmit with rate log(1+P^m)~m log P (as P→∞) outage-free, and thus achieve a multiplexing gain of m. In other words, by using interleaving, one can also achieve "the MIMO effect" from a MISO system with a very large number of antennas. The price to pay however is a training rate of O(P^m) and a feedback rate of O(P^{3m}), which are both much larger than the data transmission rate m log P. Ideally, we would like the feedback and training rates in Theorem 2 (or in another scheme with a t→∞ vanishing outage probability) to be O(log α) as α→∞.

On the other hand, regarding the data rate log(I+αP), when P is small (a typical case of a low-power system), even slight increases in α significantly improves the data transmission rate. For example, for P=1, increasing α from 1 to 3 doubles the data rate. For such scenarios with small α, tighter bounds on the training and feedback rates and/or custom-made numerically-designed interleaved schemes are a necessity. In this context, finding an efficient scheme for the numerical design of interleaved schemes would prove to be a challenging network vector quantization problem, where one has to design several interdependent vector quantizers managing the multiple feedback phases of the interleaved scheme.

Many alterations and modifications may be made by those having ordinary skill in the art without departing from the spirit and scope of the embodiments.

Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A method for improving wireless communication in a system having multiple transmitting antennas comprising:
   training one of a multiplicity of transmitting antennas of a transmitter;
   feeding back channel state information (CSI) from a receiver to the one of the multiplicity of transmitting antennas;
   improving the ability of the transmitter to transmit data to the receiver using the feedback CSI from the receiver; and
   repeating training, feeding back CSI, and improving the ability of the transmitter to transmit data according to feedback CSI on another one of the multiplicity of transmitting antennas in a one-by-one interleaved fashion.

2. The method of claim 1 further comprising providing a feedback message to request the transmitter to train another one antenna or if already trained transmitting antennas provide data transmission meeting a predetermined condition, then terminating further interleaved training of additional transmitting antennas.

3. The method of claim 2 where providing a feedback message to request the transmitter to train another antenna comprises providing side information about the channel state.

4. The method of claim 2 further comprising providing a feedback message which includes a quantized code word to be utilized by the transmitter for data transmission.

5. The method of claim 1 wherein the feeding back and training uses an overhead that is independent of the number of transmitting antennas.

6. The method of claim 1 where repeating training, feeding back channel state information and improving the ability of the transmitter to transmit data according to feedback CSI on another one of the multiplicity of transmitting antennas in a one-by-one interleaved fashion comprises achieving the same performance as a system with complete knowledge of transmitter and receiver channel state information (CSI).

7. The method of claim 1 where improving the ability of the transmitter to transmit data to the receiver using the feedback CSI from the receiver comprises training a channel $h_1$ corresponding to a first one of the transmitting antennas and waiting for receiver feedback, where feeding back channel state information CSI from the receiver to the one of the multiplicity of transmitting antennas comprises after the receiver, having acquired the knowledge of $h_1$, feeds back a one-bit feedback message "1" if $|h_1|^2 \geq \alpha$ where $\alpha$ is a chosen value greater than zero indicating that the first one of the transmitting antennas avoids outage, otherwise, feeding back a "0," indicating that the first one of the transmitting antennas will result in an outage, and wherein the method further comprises:

terminating feeding back and training if the transmitter receives a "1" and starting data transmission over the first transmitting antenna only without training remaining transmitting antennas; or if the first transmitting antenna receives a "0," training the channel state $h_2$ corresponding to a second transmitting antenna.

8. The method of claim 7 further comprising repeating training each channel $h_i$ in sequence corresponding to each corresponding transmitting antenna and waiting for receiver feedback, where feeding back channel state information CSI from the receiver to the one of the multiplicity of transmitting antennas comprises after the receiver, having acquired the knowledge of $h_1$, feeds back a one-bit feedback message "1" if $|h_1|^2 \geq \alpha$ indicating that the first one of the transmitting antennas avoids outage, otherwise, feeding back a "0," indicating that the first one of the transmitting antennas will result in an outage, terminating feeding back and training if the transmitter receives a "1", starting data transmission over the first transmitting antenna only without training remaining transmitting antennas, otherwise, if the first transmitting antenna receives a "0," training the channel state $h_{i+1}$ corresponding to a corresponding transmitting antenna until a transmitting antenna which avoid outage is found or if not transmitting over an arbitrarily chosen one of the transmitting antennas.

9. The method of claim 1 where an i th transmitting antenna has been trained so that the receiver has been sent the first i components of the CSI, where feeding back channel state information (CSI) from the receiver to the one of the multiplicity of transmitting antennas comprises:

If $\|h_i\|^2 \leq \alpha$ requesting the next antenna to be trained by sending the feedback bit "0," and training the next transmitting antenna, unless the i th transmitting antenna is the last one of the multiplicity of transmitting antennas in which case the last transmitting antenna transmits via an arbitrarily chosen beamforming vector $e_1$; or if $\|h_i\|^2 > \alpha$, feeding back an i-dimensional vector, $C_i(h_i) = q(\vec{h}_i; L(h_i))$ using $2i(L(h_i)+3)$ feedback bits and transmitting data using a t-dimensional beamforming vector at the next transmitting antenna, which i-dimensional vector is constructed by appending t-i zeroes to $C_i(h_i)$, wherein $\alpha$ is a chosen value greater than zero, wherein t is the total number of transmitting antennas within the system and wherein i is a subset of transmitting antennas within the system, wherein $h_i$ is a channel from transmitter antenna i, wherein q is a quantized vector, and wherein L(h) is a calculated resolution required to avoid outage of the $h_i$.

10. The method of claim 2 wherein improving the ability of the transmitter to transmit data to the receiver using the feedback CSI from the receiver is performed by beamforming using at least one trained transmitting antenna.

11. The method of claim 4 wherein the quantized code word to be utilized by the transmitter for data transmission comprises a variable length.

12. A method for improving wireless communication in a system having a multiplicity of transmitting antennas of tin number coupled to a transmitter communicating with a receiver where channel state information (CSI) is fed back from the receiver to the multiplicity of transmitting antennas and where the ability of the multiplicity of antennas to transmit data is improved using feedback CSI from the receiver, comprising:

training the transmitting antennas in a one-by-one interleaved fashion as follows, where when the i th transmitting antenna has been trained so that the receiver has been sent the first i components of the CSI, feeding back channel state information (CSI) from the receiver to the i+1 transmitting antenna comprises:

If $\|h_i\|^2 \leq \alpha$ requesting the i+1 transmitting antenna to be trained by sending the feedback bit "0," and training the i+1 transmitting antenna, unless the i th transmitting antenna is the t th transmitting antenna in which case the transmitting antenna is trained to transmit via an arbitrarily chosen beamforming vector $e_1$;

otherwise if $\|h_i\|^2 > \alpha$, feeding back an i-dimensional vector, $C_i(h_i) = q(L(h_i))$ using $2i(L(h_i)+3)$ feedback bits, where q(x; l) is a dead zone quantizer, $\vec{h}i$ is a beamforminq vector for channel state $h_i$, $L(h_i)$ the corresponding resolution of q, and transmitting data using a t-dimensional beamforming vector at the transmitter, which is constructed by appending t-i zeroes to $C_i(h_i)$, wherein $\alpha$ is a chosen value greater than zero, and wherein t is the total number of transmitting antennas within the system and wherein i is a subset of transmitting antennas within the system.

* * * * *